(12) United States Patent
Kong et al.

(10) Patent No.: US 11,501,153 B2
(45) Date of Patent: Nov. 15, 2022

(54) METHODS AND APPARATUS FOR TRAINING A NEURAL NETWORK

(71) Applicant: Intel Corporation, Santa Clara, CA (US)

(72) Inventors: LayWai Kong, Phoenix, AZ (US);
Takeshi Nakazawa, Phoenix, AZ (US);
Anne Hansen-Musakwa, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1136 days.

(21) Appl. No.: 15/856,755

(22) Filed: Dec. 28, 2017

(65) Prior Publication Data
US 2019/0050723 A1 Feb. 14, 2019

(51) Int. Cl.
| | |
|---|---|
| *G06N 3/08* | (2006.01) |
| *G06K 9/62* | (2022.01) |
| *G06N 7/00* | (2006.01) |
| *G06F 16/903* | (2019.01) |
| *G06N 3/04* | (2006.01) |
| *G06F 17/11* | (2006.01) |
| *G06N 5/00* | (2006.01) |

(52) U.S. Cl.
CPC ......... *G06N 3/08* (2013.01); *G06F 16/90348* (2019.01); *G06K 9/6256* (2013.01); *G06K 9/6262* (2013.01); *G06N 3/0454* (2013.01); *G06N 3/0481* (2013.01); *G06N 3/082* (2013.01); *G06N 7/005* (2013.01); *G06F 17/11* (2013.01); *G06N 5/003* (2013.01)

(58) Field of Classification Search
CPC ...... G06N 3/08; G06N 3/0454; G06N 3/0481; G06N 3/082; G06N 7/005; G06N 5/003; G06F 16/90348; G06F 17/11; G06K 9/6256; G06K 9/6262
See application file for complete search history.

(56) References Cited

PUBLICATIONS

Li, Lisha, et al. "Hyperband: A Novel Bandit-Based Approach to Hyperparameter Optimization." arXiv e-prints (2016): arXiv-1603. (Year: 2016).*

(Continued)

*Primary Examiner* — Eric Nilsson
(74) *Attorney, Agent, or Firm* — Hanley, Flight & Zimmerman, LLC

(57) ABSTRACT

Methods, apparatus, systems, and articles of manufacture for training a neural network are disclosed. An example apparatus includes a training data segmenter to generate a partial set of labeled training data from a set of labeled training data. A matrix constructor is to create a design of experiments matrix identifying permutations of hyperparameters to be tested. A training controller is to cause a neural network trainer to train a neural network using a plurality of the permutations of hyperparameters in the design of experiments matrix and the partial set of labeled training data, and access results of the training corresponding of each of the permutations of hyperparameters. A result comparator is to select a permutation of hyperparameters based on the results, the training controller to instruct the neural network trainer to train the neural network using the selected permutation of hyperparameters and the labeled training data.

23 Claims, 5 Drawing Sheets

(56) References Cited

PUBLICATIONS

Rasley, Jeff, et al. "Hyperdrive: Exploring hyperparameters with pop scheduling." Proceedings of the 18th ACM/IFIP/USENIX Middleware Conference. 2017. (Year: 2017).*

Baker, Bowen, et al. "Accelerating neural architecture search using performance prediction." arXiv preprint arXiv:1705.10823 (2017). (Year: 2017).*

Hutter, Frank, Holger Hoos, and Kevin Leyton-Brown. "An efficient approach for assessing hyperparameter importance." International conference on machine learning. PMLR, 2014. (Year: 2014).*

Bergstra et al., "Random Search for Hyper-Parameter Optimization"; J.machine learning research; p. 281-305; Feb. 2012, 25 pages.

Reliasoft Corporation, "Statistical Background on DOE," [http://reliawiki.org/index.php/Stastistical_Background_on_DOE], 2008, 21 pages.

Montgomery, "Design and Analysis of Experiments," edition 8th; 2013, 26 pages.

Lin et al., "New Developments in Designs for Computer Experiments and Physical Experiments," Ph.D. dissertation, Simon Fraser University (Canada), Canada. Retrieved Dec. 4, 2011, from Dissertations & Theses, 142 pages.

* cited by examiner

| Run | $X_1$ | $X_2$ | $X_3$ | $X_1X_2$ | $X_1X_3$ | $X_2X_3$ | $X_1X_2X_3$ | $Y$ |
|---|---|---|---|---|---|---|---|---|
| 1 | +1 | +1 | +1 | + | + | + | + | $Y_1$ |
| 2 | +1 | +1 | -1 | + | - | - | - | $Y_2$ |
| 3 | +1 | -1 | +1 | - | + | - | - | $Y_3$ |
| 4 | +1 | -1 | -1 | - | - | + | + | $Y_4$ |
| 5 | -1 | +1 | +1 | - | - | + | - | $Y_5$ |
| 6 | -1 | +1 | -1 | - | + | - | + | $Y_6$ |
| 7 | -1 | -1 | +1 | + | - | - | + | $Y_7$ |
| 8 | -1 | -1 | -1 | + | + | + | - | $Y_8$ |

FIG. 3

METHODS AND APPARATUS FOR TRAINING A NEURAL NETWORK

FIELD OF THE DISCLOSURE

This disclosure relates generally to artificial intelligence computing and, more particularly, to methods and apparatus for training a neural network.

BACKGROUND

Neural networks are useful tools that have demonstrated their value solving complex problems regarding pattern recognition, natural language processing, automatic speech recognition, etc. Neural networks operate using artificial neurons arranged into layers that process data from an input layer to an output layer, applying weighting values to the data during the processing of the data. Such weighting values are determined during a training process.

BRIEF DESCRIPTION OF THE DRAWINGS

FIG. 3 is a table representing an example design of experiments matrix that may be used by the example deep learning accelerator 140 of FIG. 1.

The figures are not to scale. In general, the same reference numbers will be used throughout the drawing(s) and accompanying written description to refer to the same or like parts.

DETAILED DESCRIPTION

Figure 1:
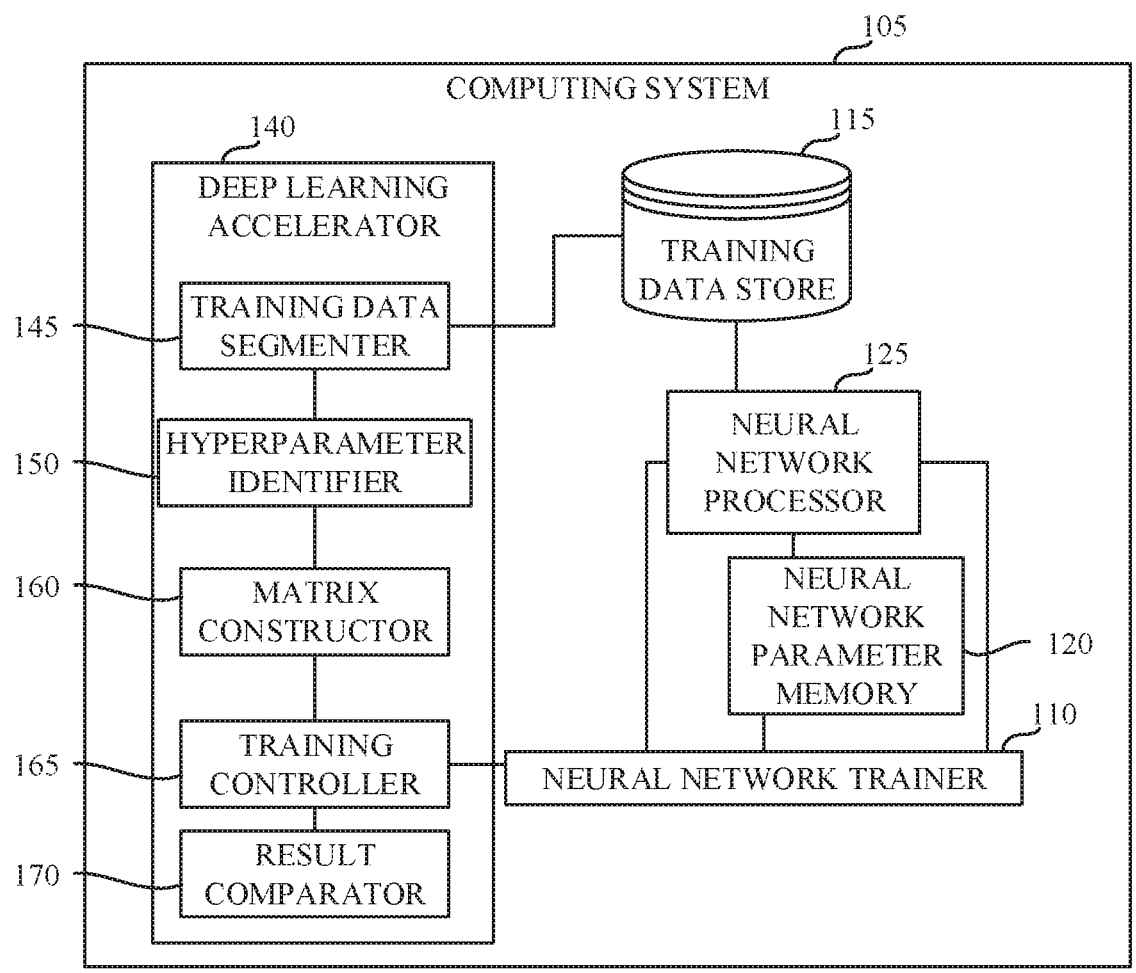
FIG. 1 is a block diagram of an example computing system including a deep learning accelerator for training a neural network.

Neural networks operate using neurons arranged into layers that pass data from an input layer to an output layer, applying weighting values to the data during processing of the data. Such weighting values are determined during a training process. Training of a neural network typically involves an iterative process of adjusting the weighting values until an input results in a desired output. When training a neural network, there are many different hyperpameters that may be used. As used herein, a hyperparameter is a parameter that specifies a structure of the neural network and/or instructions on how the neural network is to be trained. Hyperparameters may include, for example, a learning rate, a loss function, a number of training iterations to be performed, a momentum value, a number of hidden layers used in the neural network, etc. Typically, a user (e.g., a data scientist, an engineer, a researcher, etc.) selects hyperparameters to be used when training the neural network. They may then change one or more hyperparameters and re-train the neural network in an attempt to arrive at an acceptable neural network. A neural network may be considered acceptable based on, for example, an accuracy of the network, an amount of time and/or training iterations needed to train the neural network, etc.

However, training a neural network is time-consuming and computationally expensive. For example, depending upon the complexity of the neural network, the type of neural network, the size of the training data set, and the selected hyperparameters, the training may take hours, days, weeks, etc. Furthermore, such training will typically have to be repeated at least few times until the user arrives at an acceptable neural network.

Autonomous driving systems typically consider many different input parameters (e.g., image sensor inputs, global positioning system (GPS) inputs, weather condition inputs, distance sensor inputs, etc.) to control movement of an autonomous vehicle. To handle such input parameters, neural networks are frequently used in such autonomous driving systems. However, such input parameters result in complex neural networks that require large amounts of training time. Given that many different hyperparameters and/or combinations thereof may be used, each resulting in varying degrees of accuracy, selection of hyperparameters that result in an accurate model early on in the training process dramatically reduces the overall amount of training time. That is, when accounting for re-training activities due to poor initial selection of hyperparameters, autonomous driving neural network models can be created more efficiently as compared to prior approaches. Moreover, in some examples, more accurate models can be created using permutations of hyperparameters that would have otherwise not been evident.

Beyond autonomous driving systems, example approaches for training neural networks disclosed herein can be used for other systems that utilize a neural network. For example, enterprise data centers, cloud storage systems, and image classification systems typically utilize one or more neural networks (e.g., to determine where to store user data, to classify an image, etc.) and, as a result, can benefit from improved training of neural networks.

Example approaches disclosed herein provide a systematic approach for the initial selection of hyperparameters to achieve a high accuracy model while significantly reducing the total amount of training time.

Using a Design of Experiments (DOE) approach, example approaches disclosed herein seek to establish a cause-and-effect relationship between several independent variables and a dependent variable of interest. In examples disclosed herein, the independent variables are represented by hyperparameters and the dependent variable is a model accuracy resulting from the use of those hyperparameters. In a DOE approach, a series of experimental runs are identified by combining the factors at different settings or levels. Example DOE approaches disclosed herein utilize a factorial DOE approach.

Factorial DOE approaches include, for example, a full factorial DOE approach and a fractional factorial DOE approach. The full factorial DOE approach includes tests for all possible permutations of hyperparameters and potential range of values to be tested. If two levels are used in DOE, the minimum and maximum of the potential range of values will be selected as the levels (with a minimum value coded as −1 and a maximum value coded as +1 in DOE). Thus, a full factorial DOE approach enables the evaluation of the effects of a value for a particular hyperparameter, as well as the interaction(s) between different hyperparameters. These effects and interactions indicate the influence of each factor. As a result, accuracy of the resultant model can be estimated based on the permutations of hyperparameters, thereby enabling selection of a particular permutation of hyperparameters for use in training of a neural network.

The total number of tests to be performed in a full factorial approach is $L^p$ for a set of hyparameters, where p represents the number of hyperparameters, and L represents the number of levels for the hyperparameters. If, for example, an experiment involves different numbers of levels across two sets of hyperparameters, then the total of number of tests to be performed is represented by $(L_1)^{p_1} \times (L_2)^{p_2}$, where $L_1$ and $L_2$ denote the levels of two hyperparameter sets. $p_1$ and $p_2$ represent the number of hyperparameters for the two sets respectively.

In some examples, many different permutations of hyperparameters and potential ranges of values may exist, resulting in a correspondingly high number of tests to be performed. Thus, in some examples, a fractional factorial experiment may be used to reduce the number of tests to be performed. Fractional factorial designs take advantage of an assumption that higher order interactions between the hyperparameters may be assumed to be negligible. As a result, the number of tests to be performed in a DOE approach can be reduced, even in the presence of a high number of factors.

The notation for the number of tests to be performed for fractional factorial design is $L^{p-k}$, where k is the degree of fractionation, k=1, 2, 3, etc. As k increases, the total number of tests to be performed decreases. The k value is determined based on a desired resolution.

Consider an example where three different hyperparameters are to be tested, each having two levels. Using a full factorial approach, eight tests would be performed. However, for a half fraction (k=1), four tests are performed. In such an example case, the design is of resolution III, meaning that the main effects are aliased with two-way interactions, but not to other main effects. For resolution IV designs, the main effects are not aliased with any other main or interaction effects, but the two-way interactions are aliased with each other. In resolution V designs, the main and two-way interaction effects are not aliased to any other main or two-way interaction effects. However, the two-way interactions are aliased with three-way interactions. The higher the resolution, the lesser the aliasing. As a result, if the number of hyperparameters is small, a fractional factorial approach will not allow for high resolution. In contrast, as the number of hyperparameters increases, higher resolutions and a reduction in number of runs are possible in a DOE. In examples disclosed herein, many different hyperparameters exist, each having different potential ranges of values. As a result, use of fractional factorial designs may reduce the number of permutations of hyperparameters to be tested, thereby reducing the amount of computing resources to arrive at a selected permutation of hyperparameters.

FIG. 1 is a block diagram of an example computing system 105 for training a neural network. The example computing system 105 of the illustrated example of FIG. 1 includes a neural network trainer 110, a training data store 115, a neural network parameter memory 120, a neural network processor 125, and a deep learning accelerator 140. In the illustrated example of FIG. 1, the deep learning accelerator 140 includes a training data segmenter 145, a hyperparameter identifier 150, a matrix constructor 160, a training controller 165, and a result comparator 170.

The example neural network trainer 110 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The example neural network trainer 110 performs training of the neural network implemented by the neural network processor 125. In examples disclosed herein, training is performed using a stochastic gradient descent process. However, any other approach to training a neural network may additionally or alternatively be used.

The example training data store 115 of the illustrated example of FIG. 1 is implemented by any memory, storage device and/or storage disc for storing data such as, for example, flash memory, magnetic media, optical media, etc. Furthermore, the data stored in the example training data store 115 may be in any data format such as, for example, binary data, comma delimited data, tab delimited data, structured query language (SQL) structures, image data, etc. While in the illustrated example the training data store 115 is illustrated as a single element, the training data store 115 and/or any other data storage elements described herein may be implemented by any number and/or type(s) of memories. In the illustrated example of FIG. 1, the example training data store 115 stores labeled data. In examples disclosed herein, the example labeled data includes a large set of data items (e.g., images, documents, etc.), and corresponding label(s) for each of the data items. In examples disclosed herein, the example labeled data includes at least one hundred thousand items. However, any number of data items sufficient for training a neural network may additionally or alternatively be used.

The example neural network processor 125 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. In examples disclosed herein, the example neural network processor 125 implements a neural network. The example neural network of the illustrated example of FIG. 1 is a deep neural network (DNN). However, any other past, present, and/or future neural network topology(ies) and/or architecture(s) may additionally or alternatively be used such as, for example, a convolutional neural network (CNN), a feed-forward neural network. In examples disclosed herein, the deep neural network (DNN) utilizes multiple layers of artificial "neurons", each of which maps n real-valued inputs xj to a real-valued output v according to Equation 1, below:

$$v = \varphi\left(\sum_{j=1}^{n} w_j x_j + b\right) \qquad \text{Equation 1}$$

In Equation 1, $w_j$ and b are weights and biases, respectively, associated with a given neuron, and $\varphi$ is a nonlinear activation function, typically implemented by a rectified linear unit (ReLU). In some examples, deep neural networks may utilize millions or even billions of such neurons, arranged in a layered fashion. For example, one layer of neurons is fed input data, its output is fed into another layer of neurons, and so on, until the output from the final layer of neurons is taken as the output of the network as a whole. In some examples, the shape of the connections between layers may vary. For example, a fully connected topology connects every output of layer L to each neuron of the next layer. In contrast, a convolutional layer includes only a small number of neurons that are swept across patches of the input data. In examples disclosed herein, such different topologies and/or properties thereof are considered hyperparameters.

The example neural network parameter memory 120 of the illustrated example of FIG. 1 is implemented by any memory, storage device and/or storage disc for storing data such as, for example, flash memory, magnetic media, optical media, etc. Furthermore, the data stored in the example neural network parameter memory 120 may be in any data format such as, for example, binary data, comma delimited data, tab delimited data, structured query language (SQL) structures, etc. While in the illustrated example the neural network parameter memory 120 is illustrated as a single element, the neural network parameter memory 120 and/or any other data storage elements described herein may be implemented by any number and/or type(s) of memories. In the illustrated example of FIG. 1, the example neural network parameter memory 120 stores neural network weighting parameters that are used by the neural network processor 125 to process inputs for generation of one or more outputs.

The example training data segmenter 145 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. In examples disclosed herein, the example training data segmenter 145 partitions the labeled data stored in the training data store 115 into a training set and a validation set. In examples disclosed herein, the training set includes at least ten percent of the items of the labeled data set. Often, the training set will include sixty to seventy percent of the items of the training data set. The remainder of the items of the labeled data set are allocated as the validation set. In examples disclosed herein, the training data set is used to train the neural network, while the validation set is used to validate the training performed on the neural network. However, in some examples, all items may be allocated as the training set.

The example training data segmenter 145 generates a mini-training set from the training set. The mini-training set is used when evaluating the permutations of hyperparameters identified in the design of experiments approach. In some examples, the mini-training set may also be referred to as a partial set. Using a small mini-training set reduces an amount of processing resources required to test each permutation of hyperparameters. In examples disclosed herein, the training data segmenter 145 selects items from the training set for inclusion in the mini-training set randomly. However, any other approach such as, for example, a stratified sampling, may be used to ensure that inherent variabilities in the training data set are reflected in the mini-training set.

The example hyperparameter identifier 150 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. In examples disclosed herein, the example hyperparameter identifier 150 identifies hyperparameters for testing. Such hyperparameters may include, for example, a learning rate, a loss function, a number of training iterations to be performed, a momentum value, a number of hidden layers used in the neural network, and/or any other value pertaining to the structure and/or training of the neural network. In examples disclosed herein, some hyperparameters may have different potential range of values. For example, the learning rate may be a numerical value between the range of one tenth and one. Any number of incremental values may be selected for testing.

In some examples, the hyperparameter identifier 150 accesses user input to identify user a selection of value(s) for one or more hyperparameter(s). For example, the user may indicate that three hidden layers are to be used in the neural network, resulting in the number of hidden layers not being considered a variable hyperparameter for testing in the design of experiments approach. Alternatively, the user may provide multiple selected values for a particular hyperparameter to cause those different values and/or permutations thereof to be tested via the design of experiments approach. In some examples, the user defines maximum and minimum values for a given hyperparameter and step sizes to be used when preparing a design of experiments matrix.

The example matrix constructor 160 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. In examples disclosed herein, the example matrix constructor 160 constructs a design of experiment (DOE) matrix that represents the permutations of hyperparameters to be tested. The example matrix constructor 160 selects a hyperparameter and potential range of values for that hyperparameter that was identified by the hyperparameter identifier 150, and adds the selected hyperparameter and potential range of values of that hyperparameter to a design of experiments matrix. The example matrix constructor 160 determines whether there are any additional hyperparameters for testing and, if so, adds those hyperparameters (and potential ranges of values of those hyperparameters) to the existing permutations in the design of experiments matrix. This process is repeated until no additional hyperparameters are identified for testing.

The example training controller 165 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. In examples disclosed herein, the example training controller 165 selects permutations of hyperparameters for testing.

In example approaches disclosed herein, the training controller 165 selects all of the rows of the created DOE matrix for testing (representing a full factorial approach). However, in some examples, a fractional factorial approach may be used, such that the example training controller 165 selects fewer than all of the rows of the created DOE matrix. Any approach may be used to select those tests that will be carried out.

The example training controller 165 instructs the neural network trainer 110 to perform training of the neural network 125 using the selected hyperparameters and the mini-training set. In examples disclosed herein, the same mini-training set is used across all tested permutations of hyperparameters. Using the same mini-training set across all tested permutations ensures that the model accuracy measured across each of the permutations is not inadvertently affected by differences in the training data.

The example result comparator 170 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. In examples disclosed herein, the example result comparator 170 analyzes the results to estimate an effect of each hyperparameter, as well as any interaction effects for those hyperparameters. In some examples, the example result comparator 170 determines a level of significance of each hyperparameter.

The example result comparator 170 selects a permutation of hyperparameters that resulted in the most accurate model. In some examples, the permutation of hyperparameters may be selected based on a result other than the accuracy of the model such as, for example, an amount of time taken to complete the training using that permutation of hyperparameters.

In some examples, the experimental results from the testing are presented to the user by the result comparator 170. In some examples, hyperparameters that contributed to that accuracy are also presented and/or otherwise identified to the user. Displaying such results can help users (e.g., students, field engineers, data scientists, etc.) better understand the effects of different hyperparameters.

While an example manner of implementing the example computing system 105 is illustrated in FIG. 1, one or more of the elements, processes and/or devices illustrated in FIG. 1 may be combined, divided, re-arranged, omitted, eliminated and/or implemented in any other way. Further, the example neural network trainer 110, the example neural network processor 125, the example deep learning accelerator 140, the example training data segmenter 145, the example hyperparameter identifier 150, the example matrix constructor 160, the example training controller 165, the example result comparator 170, and/or, more generally, the example computing system 105 of FIG. 1 may be implemented by hardware, software, firmware and/or any combination of hardware, software and/or firmware. Thus, for example, any of the example neural network trainer 110, the example neural network processor 125, the example deep learning accelerator 140, the example training data segmenter 145, the example hyperparameter identifier 150, the example matrix constructor 160, the example training controller 165, the example result comparator 170, and/or, more generally, the example computing system 105 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example neural network trainer 110, the example neural network processor 125, the example deep learning accelerator 140, the example training data segmenter 145, the example hyperparameter identifier 150, the example matrix constructor 160, the example training controller 165, the example result comparator 170, and/or, more generally, the example computing system 105 is/are hereby expressly defined to include a non-transitory computer readable storage device or storage disk such as a memory, a digital versatile disk (DVD), a compact disk (CD), a Blu-ray disk, etc. including the software and/or firmware. Further still, the example computing system 105 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 2:
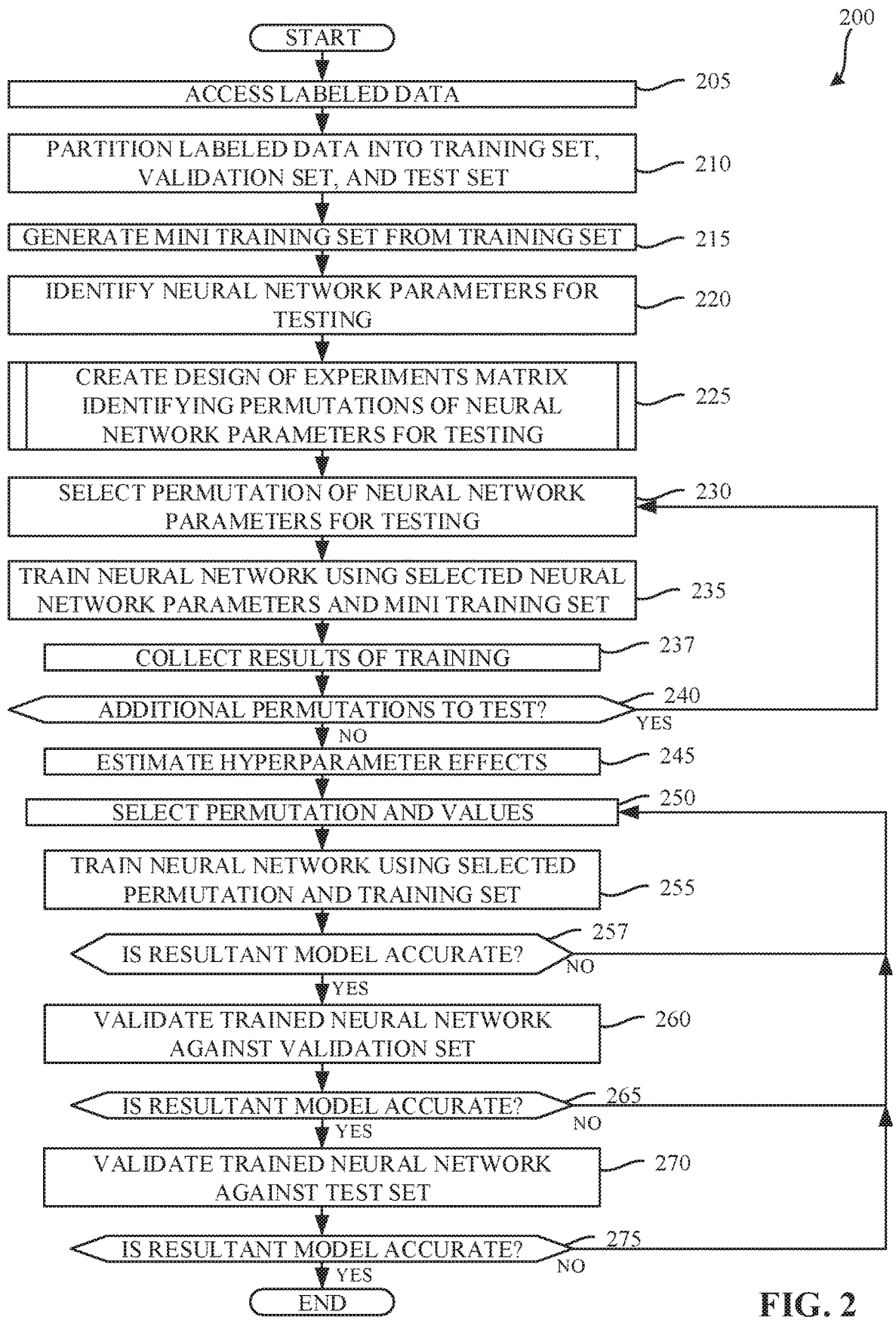
FIG. 2 is a flowchart representative of example machine readable instructions which, when executed by the example computing system of FIG. 1, cause the example computing system to train a neural network.

Flowcharts representative of example hardware logic or machine readable instructions for implementing the example computing system 105 of FIG. 1 are shown in FIGS. 2 and/or 4. The machine readable instructions may be a program or portion of a program for execution by a processor such as the processor 1012 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowcharts illustrated in FIGS. 2 and/or 4, many other methods of implementing the example computing system 105 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 2 and/or 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

FIG. 2 is a flowchart representative of example machine readable instructions which, when executed by the example computing system 105 of FIG. 1, cause the example computing system 105 to train a neural network. The example process 200 of FIG. 2, when implemented by the computing system 105 of FIG. 1, results in a neural network and/or a model thereof, that can be distributed to other computing systems.

The example process 200 of FIG. 2 begins when the example training data segmenter 145 accesses labeled data stored in the example training data store 115. (Block 205). In examples disclosed herein, the example labeled data includes a large set of data items (e.g., images, documents, etc.), and corresponding label(s) for each of the data items. In examples disclosed herein, the example labeled data includes at least one hundred thousand items. However, any number of data items sufficient for training a neural network may additionally or alternatively be used.

The example training data segmenter 145 partitions the labeled data into a training set, a validation set, and a test set. (Block 210). In examples disclosed herein, the training set includes at least ten percent of the items of the labeled data set. Often, the training set and validation set will include sixty to seventy percent of the items of the labeled data set. The remainder of the items of the labeled data set are allocated as a test set. In examples disclosed herein, the training data set is used to train the neural network, while the validation set and test set are used to validate the training performed on the neural network. However, in some examples, all items may be allocated as the training set.

The example training data segmenter 145 generates a mini-training set from the training set. (Block 215). As discussed below, the mini-training set is used when evaluating the permutations of hyperparameters identified in the design of experiments approach. Using a small mini-training set reduces an amount of processing resources required to test each permutation of hyperparameters. In examples disclosed herein, items are randomly selected from the training set for inclusion in the mini-training set. However, any other approach such as, for example, a stratified sampling, may be used to ensure that inherent variabilities in the training data set are reflected in the mini-training set.

The example hyperparameter identifier 150 identifies neural network hyperparameters for testing. (Block 220). Such hyperparameters may include, for example, a learning rate, a loss function, a number of training iterations to be performed, a momentum value, a number of hidden layers used in the neural network, etc. In examples disclosed herein, some hyperparameters may have different potential ranges of values. For example, the learning rate may be a numerical value between the range of one tenth and one. Any number of incremental values may be selected for testing.

In some examples, a user may select value(s) for one or more hyperparameter(s). For example, the user may indicate that three hidden layers are to be used in the neural network, resulting in the number of hidden layers not being considered a variable hyperparameter for testing in the design of experiments approach. Alternatively, the user may provide multiple selected values for a particular hyperparameter, to cause those different values and/or permutations thereof to be tested via the design of experiments approach. In some examples, the user defines maximum and minimum values for a given hyperparameter and step sizes to be used when preparing a design of experiments approach.

The example matrix constructor 160 constructs a design of experiment (DOE) matrix that represents the permutations of hyperparameters to be tested. (Block 225). An example approach to creating the design of experiments matrix is described in further detail in connection with FIG. 4, below. As a result, the example matrix constructor 160 outputs a DOE matrix, similar to the example DOE matrix 300 of FIG. 3.

Using the DOE matrix created by the matrix constructor 160, the example training controller 165 selects a permutation of the hyperparameters for testing. (Block 230). In example approaches disclosed herein, the DOE matrix represents a full factorial experiment, and therefore the training controller 165 selects among all of the rows of the created DOE matrix. However, in some examples, a fractional factorial approach may be used, such that the example training controller 165 selects among less than all of the rows of the created DOE matrix. Any approach may be used to select those tests that will be carried out.

The example training controller 165 instructs the neural network trainer 110 to perform training of the neural network 125 using the selected hyperparameters and the mini-training set. (Block 235). As a result of the training, a model representing the weighting values to be used by the neural network are stored in the neural network parameter memory 120.

The example training controller 165 collects results of the training performed by the neural network trainer 110. (Block 237). In examples disclosed herein, the collected results include the model accuracy. However, any other training results and/or statistics concerning the training of the neural network may additionally or alternatively be used such as, for example, a number of iterations used to perform the training, an amount of time used to perform the training, etc. The example training controller 165 determines whether there are any additional permutations to test. (Block 240).

If there are additional permutations to test (e.g., Block 240 returns a result of YES), control proceeds to block 240, where a next permutation is selected for testing, and the neural network trainer 110 is instructed to attempt training of the neural network. In examples disclosed herein, the same mini-training set is used across all tested permutations of hyperparameters. Using the same mini-training set across all tested permutations ensures that the model accuracy measured across each of the permutations is not inadvertently affected by differences in the training data. While in the illustrated example of FIG. 2, the training across each of the permutations to be tested is performed serially, in some examples, the testing may be performed in parallel.

Upon completion of the testing of the permutations (e.g., block 240 returning a result of NO), the example result comparator 170 analyzes the results to estimate an effect of each hyperparameter, as well as any interaction effects for those hyperparameters. (Block 245). In examples disclosed herein, the interaction effects for each of the hyperparameters are estimated by solving for Equation 2, below.

$$Y = \beta_0 + \beta_1 X_1 + \beta_2 X_2 + \beta_3 X_3 + \beta_{12} X_1 X_2 + \beta_{13} X_1 X_3 + \beta_{23} X_2 X_3 + \beta_{123} X_1 X_2 X_3 + \epsilon \quad \text{Equation 2}$$

In Equation 2 above, Y represents a dependent variable (e.g., training error), which can be modeled as a linear function of the hyperparameters, $X_i$, used in the experiment. $\beta_i$ and $\beta_{ij}$ represent model coefficients. $\beta_i$ represents the main effect of each hyperparameter, while $\beta_{ij}$ represents interaction effects between two hyperparameters. $\epsilon$ represents an amount of error. In examples disclosed herein, $\beta_i$ can be determined using Equation 3, below:

$$\beta_i = \overline{Y}_{xi}^+ - \overline{Y}_{xi}^- \quad \text{Equation 3}$$

In Equation 3 above, $\overline{Y}_{xi}^+$ represents the output average of all −1 levels, while $\overline{Y}_{xi}^-$ represents the output average of all +1 levels. Thus, main effects of a hyperparameter can be modeled as the subtraction of an output average of all −1 levels ($Y_{xi}^-$) from an output average of all +1 levels ($\overline{Y}_{xi}^+$).

Further, two-way interactions can be estimated using Equation 4, below:

$$\beta_{ij} = \overline{Y}_{xiji}^+ - \overline{Y}_{xixj}^-$$  Equation 4

In Equation 4 above, $Y_{xixj}^-$ represents the output average of all −1 levels, while $Y_{xixj}^+$ represents the output average of all +1 levels. Thus, interaction effects between hyperparameters can be modeled as the subtraction of the output average of all −1 levels ($\overline{Y}_{xixj}^-$) from output average of all +1 levels ($\overline{Y}_{xixj}^+$). Interaction effects between three or more hyperparameters can additionally or alternatively be determined.

Next, a t-statistic is computed to test the significance using Equation 5 below:

$$t = \frac{\text{effect estimate}}{\text{standard error of effect estimate}}$$  Equation 5

In Equation 5 above, t is computed as the estimated effect divided by the standard error of that estimated effect. t can alternatively be calculated using Equation 6 below:

$$t = \frac{\overline{Y}_+ - \overline{Y}_-}{\sqrt{\frac{MSE}{n}}}$$  Equation 6

In Equation 6 above, n represents a number of training iterations performed, while MSE represents a Mean Square Error (variation of the replication within each design point). In some examples, a level of significance is determined by the result comparator 170 based on a calculated probability of a hypothesis. A first hypothesis, $H_0$, is a hypothesis that the true effect is zero, and a second hypothesis, $H_\alpha$, is a hypothesis that the true effect is not zero. If $|t|>t(\alpha/2, 2^k(m-1))$ or equivalently, if a P-value<($\alpha$=0.05), the effect is considered significant by the result comparator 170. Otherwise, the result is not considered significant by the result comparator 170. In examples disclosed herein, if no replication is performed (e.g., if the mini-training sets are different), a significance can be established using Lenth's Pseudo standard error for testing effects.

The example result comparator 170 selects the permutation of hyperparameters and values of those hyperparameters that resulted in the most accurate model. (Block 250). In some examples, the permutation of hyperparameters may be selected based on a result other than the accuracy of the model such as, for example, an amount of time taken to complete the training using that permutation of hyperparameters.

In some examples, the experimental results from the testing are presented to the user by the result comparator 170. In some examples, hyperparameters that contributed to that accuracy are also presented to the user. Displaying such results can help users (e.g., students, field engineers, data scientists, etc.) better understand the effects of different hyperparameters.

Using the selected permutation of hyperparameters, the example training controller 165 instructs the neural network trainer 110 to train the neural network 125. (Block 255). In contrast to the training performed in connection with block 235 (which uses the mini-training set), the training performed in connection with block 255 is performed based on the entire training set. When the training is complete, the example training controller 165 determines whether the resultant model is accurate. (Block 257). In examples disclosed herein, the accuracy is determined by instructing the neural network processor 125 to process the items in the training set, and counting items where the resultant output matches the expected output. However, any other approach to determining an accuracy of a model may additionally or alternatively be used such as, for example, counting items where the resultant output does not match the expected output. In examples disclosed herein, the model is considered accurate when the items having correct outputs represent a percentage of the training set that is greater than a threshold percentage. In examples disclosed herein, a threshold of ninety-nine percent is used. However, any other threshold may additionally or alternatively be used and, in some examples, may be input by and/or selected by a user.

If the example training controller 165 determines that the model is not accurate (block 257 returns a result of NO), control proceeds to block 250, where a different permutation of hyperparameters is selected and used for training the neural network. In some examples, the newly selected hyperparameters represent a fine-tuning adjustment to the prior selected hyperparameters. If the example training controller 165 determines that the model is accurate in the context of the training data set (block 257 returns a result of YES), the example training controller 165 validates the trained neural network against the validation set. (Block 260). The example training controller 165 validates the model against the training set by instructing the neural network processor 125 to process the items in the validation set, and count those items where the resultant output does not match the expected output. If the testing of the validation set indicates that the resultant model is not accurate (block 265 returns a result of NO), control proceeds to block 250, where a different permutation of hyperparameters is selected and used for training the neural network.

If the testing of the validation set confirms that the model is accurate (Block 265 returns a result of YES), the example training controller 165 validates the trained neural network against the test set. (Block 270). The example training controller 165 validates the model against the test set by instructing the neural network processor 125 to process the items in the test set, and count those items where the resultant output does not match the expected output. If the testing of the validation set indicates that the resultant model is not accurate (block 275 returns a result of NO), control proceeds to block 250, where a different permutation of hyperparameters is selected and used for training the neural network.

If the testing of the test set confirms that the model is accurate (Block 275 returns a result of YES), the example process of FIG. 2 terminates. The resultant model may then be used by the neural network processor 125 to process subsequent inputs. In some examples, the resultant model may be provided to a neural network processor separate from the neural network processor 125 of FIG. 1. That is, the model may be distributed to other computing systems for implementation.

FIG. 3 is a table representing an example design of experiments matrix 300 that may be used by the example deep learning accelerator 140 of FIG. 1. The example matrix 300 the illustrated example of FIG. 3 includes a run column 305, a first main effect column 310, a second main effect column 315, a third main effect column 320, a first two factor interaction column 325, a second two factor interaction column 330, a third two factor interaction column 335, a three factor interaction column 340, and an output column 345. The example matrix 300 of the illustrated example of FIG. 3 includes eight run columns 350, 355, 360, 365, 370, 375, 380, 385. The example matrix 300 the illustrated example of FIG. 3 represents an experiment where three hyperparameters, each having two potential levels, are to be tested. As a result, the total number of runs (corresponding to the total number of rows) is eight. The two potential levels for the hyperparameters are encoded as +1 and −1. In some examples this coding also represents a tested range of the hyperparameter, where +1 represents the maximum value of the tested range, and −1 represents the minimum value of the tested range.

Figure 4:
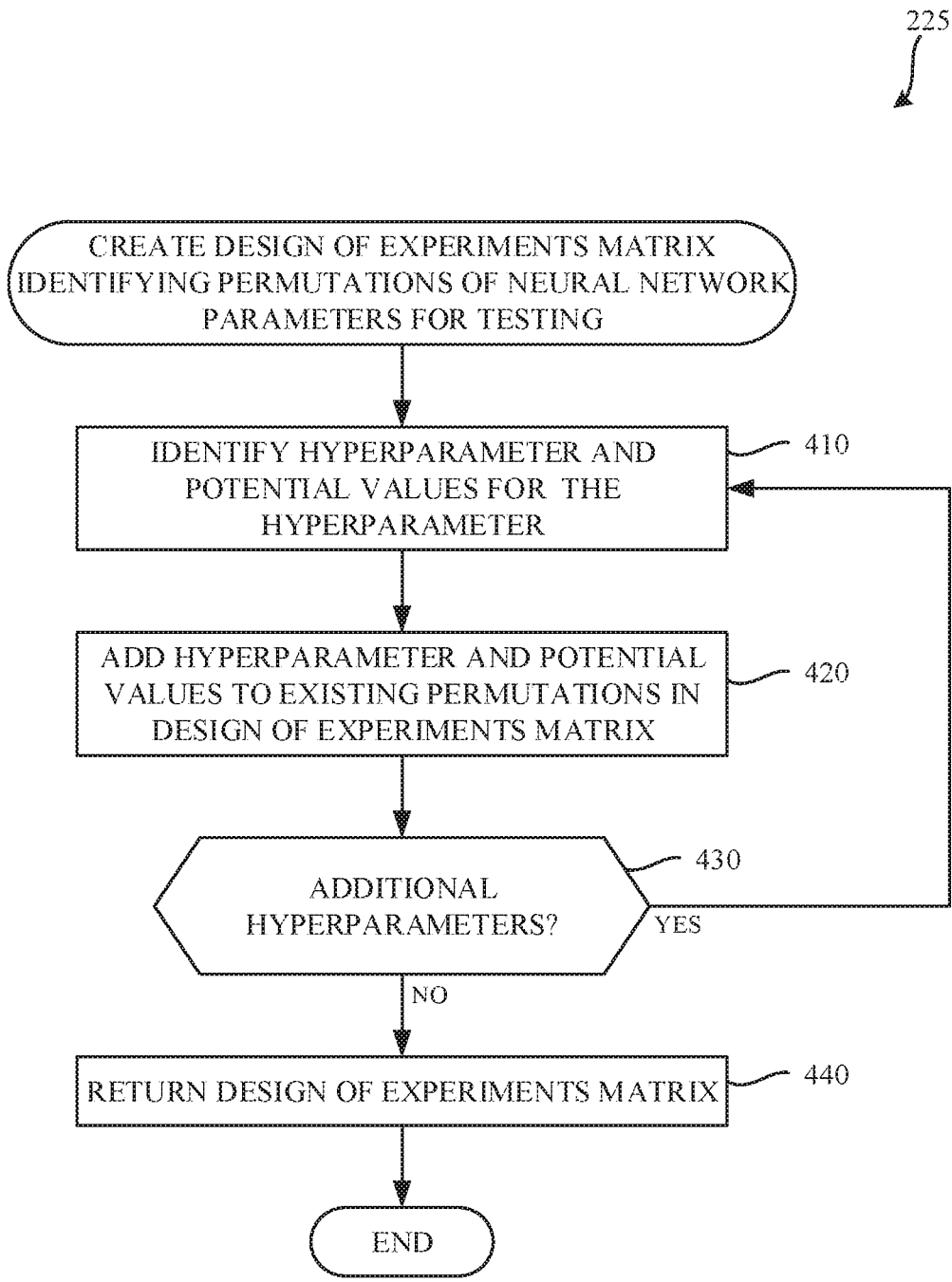
FIG. 4 is a flowchart representative of example machine readable instructions to cause the example matrix constructor 160 of FIG. 1 to create a design of experiments matrix.

FIG. 4 is a flowchart representative of example machine readable instructions to cause the example matrix constructor 160 of FIG. 1 to create a design of experiments matrix. The example process 225 of the illustrated example of FIG. 4 begins when the example matrix constructor 160 selects a hyperparameter and potential range of values for that hyperparameter that was identified by the hyperparameter identifier 150. (Block 410). The example matrix constructor adds the selected hyperparameter and potential ranges of values of that hyperparameter to a design of experiments matrix. (Block 420). If, for example, a single hyperparameter having two levels were to be tested, the resultant matrix would include two runs corresponding to each value of the hyperparameter to be tested. The example matrix constructor 160 then determines whether there are any additional hyperparameters for testing. (Block 430). If additional hyperparameters exist for testing (e.g. block 430 returns a result of YES), the example matrix constructor 160 identifies that hyperparameter and the potential ranges of values for that hyperparameter. (Block 410). The hyperparameter and potential ranges of values for that hyperparameter are added to the existing permutations in the design of experiments matrix. (Block 420). For example, if a second hyperparameter having two levels were identified, the design of experiments matrix would be augmented to reflect four permutations of hyperparameters.

The example process of blocks 410 through 430 are then repeated until no additional hyperparameters are identified for testing. (e.g., until block 430 returns a result of no). For example, if a third hyperparameter were identified having two levels, the design of experiments matrix would be augmented to reflect eight permutations of hyperparameters, and would appear similar to the example design of experiments matrix 300 of FIG. 3.

When no additional hyperparameters are identified for testing, the example matrix constructor 160 returns the constructed design of experiments matrix to the training controller 165. (Block 440). The example design of experiments matrix may then be used to perform tests represented by each of the rows of the design of experiments matrix.

Figure 5:
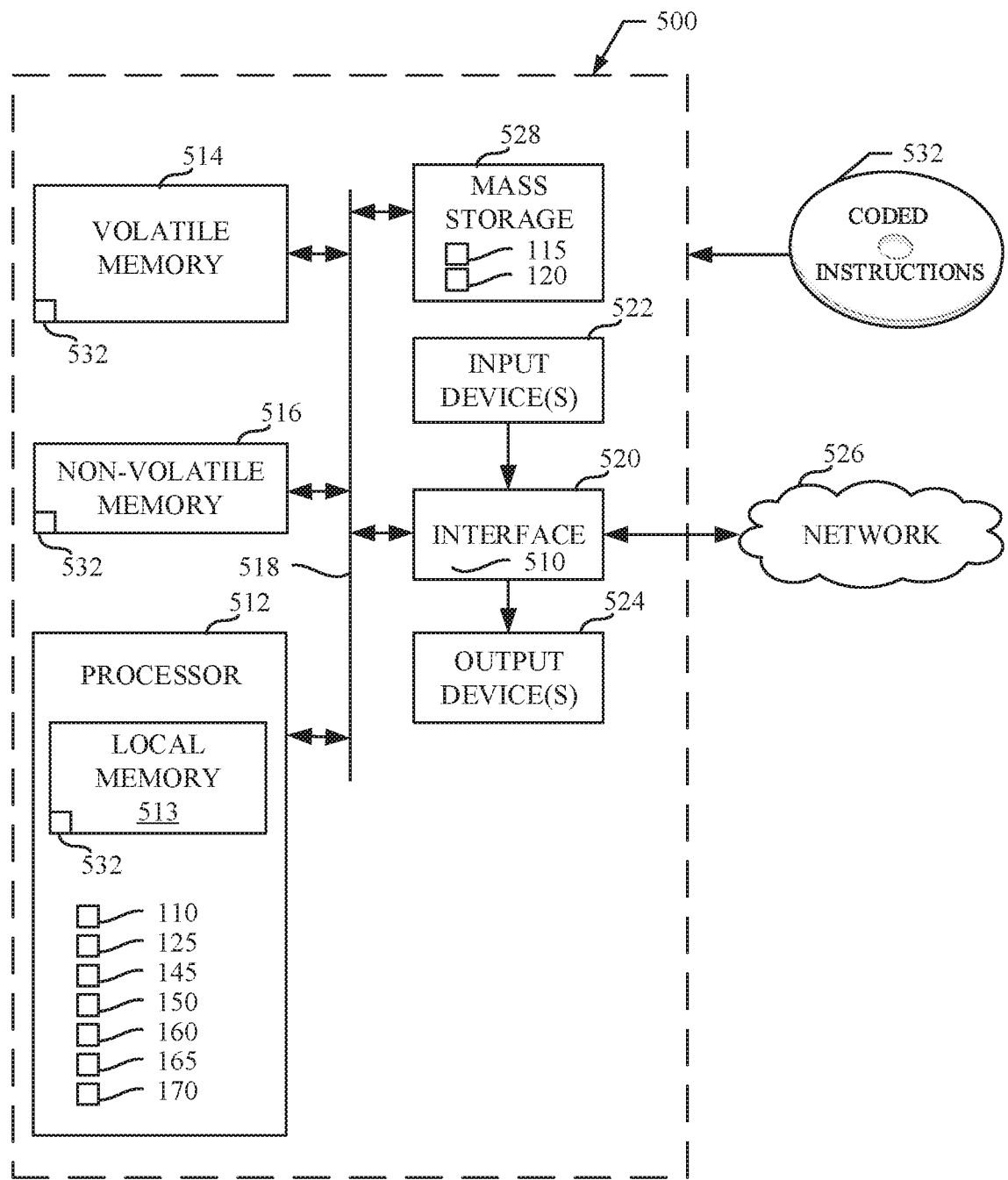
FIG. 5 is a block diagram of an example processing platform structured to execute the instructions of FIGS. 2 and/or 4 to implement the example computing system of FIG. 1.

FIG. 5 is a block diagram of an example processor platform 500 structured to execute the instructions of FIGS. 2 and/or 4 to implement the computing system 105 of FIG. 1. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example neural network trainer 110, the example, neural network processor 125, the example training data segmenter 145, the example hyperparameter identifier 150, the example matrix constructor 160, the example training controller 165, and/or the example result comparator 170.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

The machine executable instructions 532 of FIGS. 2 and/or 4 may be stored in the mass storage device 528, in the volatile memory 514, in the non-volatile memory 516, and/or on a removable non-transitory computer readable storage medium such as a CD or DVD. In the illustrated example of FIG. 5, the example mass storage implements the example training data store 115, and/or the example neural network parameter memory 120.

From the foregoing, it will be appreciated that example methods, apparatus and articles of manufacture have been disclosed that enable more efficient training of neural networks. For example, instead of having a data scientist cause a neural network to be trained using a given set of hyperparameters, only to find out that the set of hyperparameters does not result in an accurate neural network, example approaches disclosed herein improve efficiency by testing various permutations of hyperparameters against a reduced set of training items, and selecting a permutation of hyperparameters based on the results. Using a design of experiments approach, the number of permutations to be tested can be reduced (e.g., hyperparameters can be aliased), enabling a permutation that was not tested to be selected. Such an approach, reduces computing resource requirements, as wasted attempts to train the neural network using complete sets of training data are avoided.

Example 1 includes an apparatus for training a neural network, the apparatus comprising a training data segmenter to generate a partial set of labeled training data from a set of labeled training data, a matrix constructor to create a design of experiments matrix identifying permutations of hyperparameters to be tested, a training controller to cause a neural network trainer to train a neural network using a plurality of the permutations of hyperparameters in the design of experiments matrix and the partial set of labeled training data, the training controller to access results of the training corresponding of each of the permutations of hyperparameters, and a result comparator to select a permutation of hyperparameters based on the results, the training controller to instruct the neural network trainer to train the neural network using the selected permutation of hyperparameters and the labeled training data.

Example 2 includes the apparatus of example 1, wherein the hyperparameters to be tested represent instructions on how the neural network is to be trained.

Example 3 includes the apparatus of example 1, wherein the partial set of labeled training data represents less than ten percent of the labeled training data.

Example 4 includes the apparatus of example 1, wherein the result represents an accuracy of the training of the neural network.

Example 5 includes the apparatus of example 1, wherein the training controller is further to, in response to completion of the training of the neural network using the selected permutation and the labeled training data, validate the neural network.

Example 6 includes the apparatus of example 5, wherein the training controller is further to, in response to determining that the neural network is not accurate, cause the neural network trainer to train the neural network using a second permutation of hyperparameters and the labeled training data.

Example 7 includes the apparatus of example 1, wherein the plurality of permutations of hyperparameters in the design of experiments matrix represents all of the permutations of hyperparameters in the design of experiments matrix.

Example 8 includes the apparatus of example 1, wherein the plurality of permutations of hyperparameters in the design of experiments matrix represents less than all of the permutations of hyperparameters in the design of experiments matrix.

Example 9 includes the apparatus of any one of examples 1-8, wherein the result comparator is further to estimate interaction effects among the hyperparameters based on the results.

Example 10 includes the apparatus of example 9, wherein the result comparator is further to cause the estimated interaction effects to be displayed to a user.

Example 11 includes at least one non-transitory computer readable medium comprising instructions which, when executed, cause a processor to at least generate a partial set of labeled training data from a set of labeled training data, create a design of experiments matrix identifying permutations of hyperparameters to be tested, train a neural network using a plurality of the permutations of hyperparameters in the design of experiments matrix and the partial set of labeled training data, access results of the training corresponding of each of the permutations of hyperparameters, select a permutation of hyperparameters based on the results, and train the neural network using the selected permutation and the labeled training data.

Example 12 includes the at least one non-transitory computer readable medium of example 11, wherein the hyperparameters to be tested represent instructions on how the neural network is to be trained.

Example 13 includes the at least one non-transitory computer readable medium of example 11, wherein the partial set of labeled training data represents less than ten percent of the labeled training data.

Example 14 includes the at least one non-transitory computer readable medium of example 11, wherein the result represents an accuracy of the training of the neural network.

Example 15 includes the at least one non-transitory computer readable medium of example 11, wherein the instructions, when executed, cause the processor to, in response to completion of the training of the neural network using the selected permutation and the labeled training data, validate the neural network.

Example 16 includes the at least one non-transitory computer readable medium of example 15, wherein the instructions, when executed, cause the processor to, in response to a determination that the neural network is not accurate select a second permutation of hyperparameters, and train the neural network using the second permutation of hyperparameters and the labeled training data.

Example 17 includes the at least one non-transitory computer readable medium of example 11, wherein the plurality of permutations of hyperparameters in the design of experiments matrix represents all of the permutations of hyperparameters in the design of experiments matrix.

Example 18 includes the at least one non-transitory computer readable medium of example 11, wherein the plurality of permutations of hyperparameters in the design of experiments matrix represents less than all of the permutations of hyperparameters in the design of experiments matrix.

Example 19 includes the at least one non-transitory computer readable medium of any one of examples 11-18, wherein the instructions, when executed, cause the processor to estimate interaction effects among the hyperparameters based on the results.

Example 20 includes the at least one non-transitory computer readable medium of example 19, further including displaying the estimated interaction effects to a user.

Example 21 includes a method for training a neural network, the method comprising generating a partial set of labeled training data from a set of labeled training data, creating, by executing an instruction with a processor, a design of experiments matrix identifying permutations of hyperparameters to be tested, training, by executing an instruction with the processor, a neural network using a plurality of the permutations of hyperparameters in the design of experiments matrix and the partial set of labeled training data, accessing results of the training corresponding of each of the permutations of hyperparameters, selecting, by executing an instruction with the processor, a permutation of hyperparameters based on the results, and training, by executing an instruction with the processor, the neural network using the selected permutation and the labeled training data.

Example 22 includes the method of example 21, wherein the hyperparameters to be tested represent instructions on how the neural network is to be trained.

Example 23 includes the method of example 21, wherein the partial set of labeled training data represents less than ten percent of the labeled training data.

Example 24 includes the method of example 21, wherein the result represents an accuracy of the training of the neural network.

Example 25 includes the method of example 21, further including validating the neural network.

Example 26 includes the method of example 25, further including, in response to determining that the neural network is not accurate selecting a second permutation of hyperparameters, and training the neural network using the second permutation of hyperparameters and the labeled training data.

Example 27 includes the method of example 21, wherein the plurality of permutations of hyperparameters in the design of experiments matrix represents all of the permutations of hyperparameters in the design of experiments matrix.

Example 28 includes the method of example 21, wherein the plurality of permutations of hyperparameters in the design of experiments matrix represents less than all of the permutations of hyperparameters in the design of experiments matrix.

Example 29 includes the method of any one of examples 21-28, further including estimating interaction effects among the hyperparameters based on the results.

Example 30 includes the method of example 29, further including displaying the estimated interaction effects to a user.

Example 31 includes an apparatus for training a neural network, the apparatus comprising means for generating a partial set of labeled training data from a set of labeled training data, means for creating a design of experiments matrix identifying permutations of hyperparameters to be tested, means for training a neural network using a plurality of the permutations of hyperparameters in the design of experiments matrix and the partial set of labeled training data, the means for training to access results of the training corresponding of each of the permutations of hyperparameters, and means for selecting a permutation of hyperparameters based on the results, the means for training to train the neural network using the selected permutation and the labeled training data.

Example 32 includes the apparatus of example 31, wherein the hyperparameters to be tested represent instructions on how the neural network is to be trained.

Example 33 includes the apparatus of example 31, wherein the partial set of labeled training data represents less than ten percent of the labeled training data.

Example 34 includes the apparatus of example 31, wherein the result represents an accuracy of the training of the neural network.

Example 35 includes the apparatus of example 31, wherein the means for training is further to, in response to completion of the training of the neural network using the selected permutation and the labeled training data, validate the neural network.

Example 36 includes the apparatus of example 35, wherein the means for testing is further to, in response to determining that the neural network is not accurate, cause the neural network trainer to train the neural network using a second permutation of hyperparameters and the labeled training data.

Example 37 includes the apparatus of example 31, wherein the plurality of permutations of hyperparameters in the design of experiments matrix represents all of the permutations of hyperparameters in the design of experiments matrix.

Example 38 includes the apparatus of any one of examples 31-38, wherein the plurality of permutations of hyperparameters in the design of experiments matrix represents less than all of the permutations of hyperparameters in the design of experiments matrix.

Example 39 includes the apparatus of example 31, further including estimating interaction effects among the hyperparameters based on the results.

Example 40 includes the apparatus of example 39, wherein the means for selecting is further to cause the estimated interaction effects to be displayed to a user.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus for training a neural network, the apparatus comprising:
   training data segmenter circuitry to generate a partial set of labeled training data from a set of labeled training data;
   matrix constructor circuitry to create a design of experiments matrix identifying permutations of hyperparameters to be tested;
   training controller circuitry to:
      cause a neural network trainer to train a neural network using a plurality of the permutations of the hyperparameters in the design of experiments matrix and the partial set of labeled training data; and
      access results of the training corresponding to each of the permutations of the hyperparameters; and
   result comparator circuitry to:
      estimate interaction effects based on a linear function of the hyperparameters using model coefficients and an error; and
      select a permutation of hyperparameters based on the results, the training controller circuitry to instruct the neural network trainer to train the neural network using the selected permutation of the hyperparameters and the labeled training data.

2. The apparatus of claim 1, wherein the hyperparameters to be tested represent instructions on how the neural network is to be trained.

3. The apparatus of claim 1, wherein the partial set of labeled training data represents less than ten percent of the labeled training data.

4. The apparatus of claim 1, wherein the result represents an accuracy of the training of the neural network.

5. The apparatus of claim 1, wherein the training controller circuitry is further to, in response to completion of the training of the neural network using the selected permutation and the labeled training data, validate the neural network.

6. The apparatus of claim 5, wherein the training controller circuitry is further to, in response to determining that the neural network is not accurate, cause the neural network trainer to train the neural network using a second permutation of hyperparameters and the labeled training data.

7. The apparatus of claim 1, wherein the plurality of the permutations of hyperparameters in the design of experiments matrix represents all of the permutations of hyperparameters in the design of experiments matrix.

8. The apparatus of claim 1, wherein the plurality of the permutations of hyperparameters in the design of experiments matrix represents less than all of the permutations of hyperparameters in the design of experiments matrix.

9. The apparatus of claim 1, wherein the result comparator circuitry is further to cause the estimated interaction effects to be displayed to a user.

10. The apparatus of claim 1, wherein the model coefficients correspond to effects of the hyperparameters, the effects of the hyperparameters including a first effect and a second effect, the first effect based on a difference between (1) a first average corresponding to a first level and (2) a second average corresponding to a second level.

11. The apparatus of claim 10, wherein the first level corresponds to a minimum range of values and the second level corresponds to a maximum range of values.

12. The apparatus of claim 10, wherein the results comparator circuitry is to determine significances of the hyperparameters based on the first effect divided by a standard error of the first effect.

13. The apparatus of claim 10, wherein the results comparator circuitry is to determine significances of the hyperparameters based on a number of performed training iterations and a mean square error.

14. At least one non-transitory computer readable medium comprising instructions which, when executed, cause one or more processors to at least:
generate a partial set of labeled training data from a set of labeled training data;
create a design of experiments matrix identifying permutations of hyperparameters to be tested;
train a neural network using a plurality of the permutations of the hyperparameters in the design of experiments matrix and the partial set of labeled training data;
access results of the training corresponding of each of the permutations of the hyperparameters;
estimate interaction effects based on a linear function of the hyperparameters using effects of the hyperparameters and an error;
select a permutation of hyperparameters based on the results; and
train the neural network using the selected permutation and the labeled training data.

15. The at least one non-transitory computer readable medium of claim 11, wherein the hyperparameters to be tested represent instructions on how the neural network is to be trained.

16. The at least one non-transitory computer readable medium of claim 11, wherein the partial set of labeled training data represents less than ten percent of the labeled training data.

17. The at least one non-transitory computer readable medium of claim 11, wherein the result represents an accuracy of the training of the neural network.

18. The at least one non-transitory computer readable medium of claim 11, wherein the instructions, when executed, cause the processor to, in response to completion of the training of the neural network using the selected permutation and the labeled training data, validate the neural network.

19. The at least one non-transitory computer readable medium of claim 15, wherein the instructions, when executed, cause the processor to, in response to a determination that the neural network is not accurate:
select a second permutation of hyperparameters; and
train the neural network using the second permutation of hyperparameters and the labeled training data.

20. The at least one non-transitory computer readable medium of claim 11, wherein the plurality of the permutations of hyperparameters in the design of experiments matrix represents all of the permutations of hyperparameters in the design of experiments matrix.

21. The at least one non-transitory computer readable medium of claim 11, wherein the plurality of the permutations of hyperparameters in the design of experiments matrix represents less than all of the permutations of hyperparameters in the design of experiments matrix.

22. A method for training a neural network, the method comprising:
generating a partial set of labeled training data from a set of labeled training data;
creating, by executing an instruction with a processor, a design of experiments matrix identifying permutations of hyperparameters to be tested;
training, by executing an instruction with the processor, a neural network using a plurality of the permutations of hyperparameters in the design of experiments matrix and the partial set of labeled training data;
accessing results of the training corresponding of each of the permutations of hyperparameters;
estimating, by executing an instruction with the processor, interaction effects among the hyperparameters using model coefficients and an error;
selecting, by executing an instruction with the processor, a permutation of hyperparameters based on the results; and
training, by executing an instruction with the processor, the neural network using the selected permutation and the labeled training data.

23. An apparatus comprising:
memory;
instructions; and
processor circuitry to execute the instructions to:
generate a partial set of labeled training data from a set of labeled training data;
create a design of experiments matrix identifying permutations of hyperparameters to be tested;
train a neural network using a plurality of the permutations of the hyperparameters in the design of experiments matrix and the partial set of labeled training data;
access results of the training corresponding of each of the permutations of the hyperparameters;

estimate interaction effects based on a linear function of the hyperparameters using effects of the hyperparameters and an error;
select a permutation of hyperparameters based on the results; and
train the neural network using the selected permutation and the labeled training data.

* * * * *